US008821289B2

(12) United States Patent
Green et al.

(10) Patent No.: US 8,821,289 B2
(45) Date of Patent: Sep. 2, 2014

(54) PARTIAL PAY PROGRESSIVES

(75) Inventors: Anthony E. Green, Henderson, NV (US); Brian L. Kuehling, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 370 days.

(21) Appl. No.: 13/210,225

(22) Filed: Aug. 15, 2011

(65) Prior Publication Data

US 2012/0129594 A1 May 24, 2012

Related U.S. Application Data

(60) Provisional application No. 61/373,401, filed on Aug. 13, 2010.

(51) Int. Cl.

*A63F 9/24* (2006.01)
*A63F 13/00* (2014.01)
*G06F 17/00* (2006.01)
*G06F 19/00* (2011.01)

(52) U.S. Cl.

USPC .......... 463/42

(58) Field of Classification Search

USPC .......... 463/16, 27, 42
See application file for complete search history.

(56) References Cited

U.S. PATENT DOCUMENTS

2003/0181231 A1* 9/2003 Vancura et al. .......... 463/9
2009/0325682 A1* 12/2009 Barney et al. .......... 463/20

* cited by examiner

*Primary Examiner* — Omkar Deodhar
*Assistant Examiner* — Reginald Renwick
(74) *Attorney, Agent, or Firm* — Marvin Hein

(57) ABSTRACT

A progressive jackpot system includes a progressive jackpot system controller, and a plurality of gaming machines coupled to the progressive jackpot system controller and participating in a progressive jackpot game in which a progressive jackpot is awarded in response to a triggering event at one of the gaming machines. A method of operating the progressive jackpot system includes maintaining data in the progressive jackpot system controller representing a composite progressive jackpot pool comprising a predetermined base component, and an incremental component funded by a portion of wagers made at the gaming machines. A message is sent from the gaming machine to the progressive jackpot system controller in response to the occurrence of a triggering event on the gaming machine. The message indicates that the triggering event has occurred and includes data representing a desired proportion of the progressive jackpot pool to award to the player. The progressive jackpot system controller calculates a composite progressive jackpot award for the player based on the desired progressive jackpot proportion. The composite progressive jackpot award comprises a first component funded from the predetermined base component of the progressive jackpot poll, and a second component funded from the incremental component of the progressive jackpot pool. A message is sent from the progressive jackpot system controller to the gaming machine indicating the amount of the progressive jackpot award for the player. The progressive jackpot system controller replenishes the base component of the progressive jackpot pool to the predetermined amount.

10 Claims, 5 Drawing Sheets

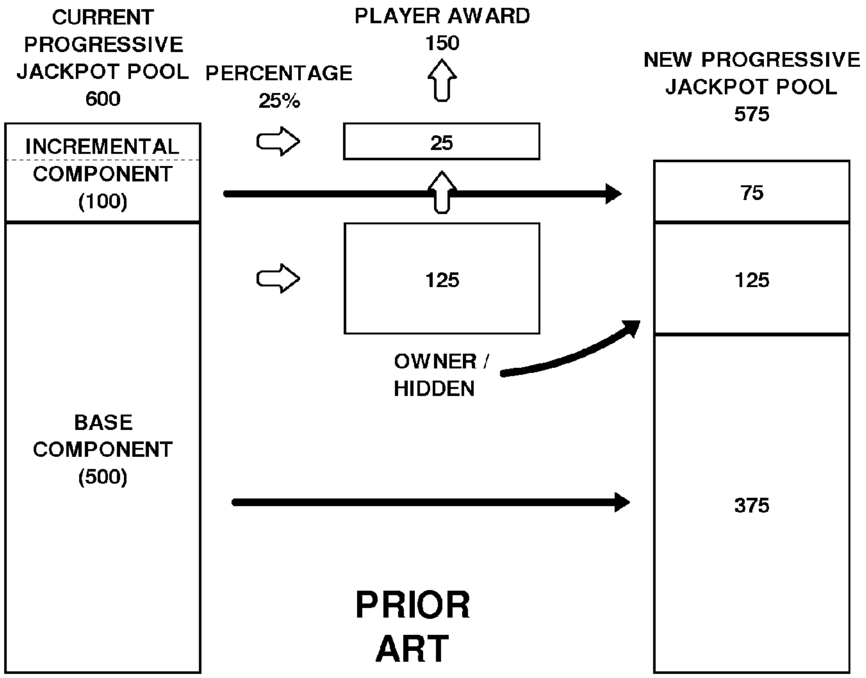
Fig. 3
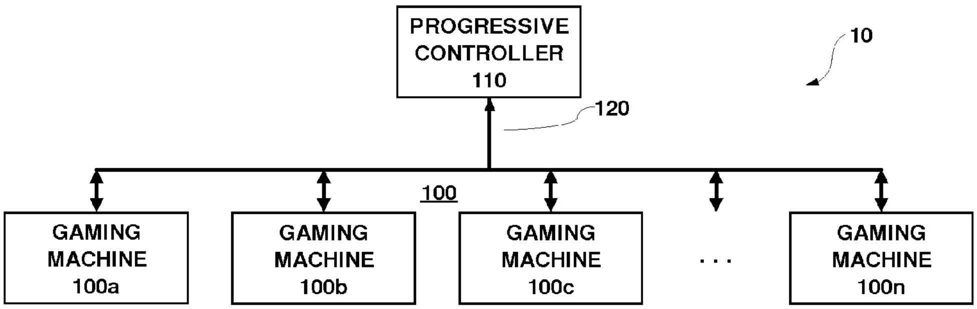
Fig. 4
500
| Credits wagered | 1 | 2 | 3 | 4 | 5 |
|---|---|---|---|---|---|
| Partial pay % | 10% | 20% | 30% | 40% | 100% |
| Credits won | 60 | 120 | 180 | 240 | 600 |
Fig. 5

PARTIAL PAY PROGRESSIVES

FIELD OF THE INVENTION

The present invention relates to progressive systems, and in particular to progressives systems in which partial pays are awarded.

BACKGROUND OF THE INVENTION

In a progressive jackpot system, one or more gaming machines participate in awarding a progressive jackpot. Referring to FIG. 1, in such a system, an owner or operator initially contributes a predetermined base component to a progressive jackpot pool, typically from promotional funds. In FIG. 1, this predetermined amount is 500 units. In addition, a portion of each wager on the participating gaming machines is added to an incremental component the progressive jackpot pool. Thus, the amount in the progressive jackpot pool increases as players wager at the participating gaming machines. In FIG. 1, this amount is currently 100 units. When a trigger (described below) occurs at one of the participating gaming machines, the money in the progressive jackpot pool is paid to the player of that gaming machine. In FIG. 1 the player award is the total of the base component, 500 units, and the incremental component 100 units, or 600 units. A new progressive jackpot pool is then replenished by the owner or operator contributing the base component, or 500 units. The participating machines continue to contribute a portion of each wager to the incremental component of the progressive jackpot pool until it is won again. The trigger can include several criteria. Typically, a predetermined combination of game symbols (i.e. winning symbols) must occur on a win line of a participating gaming machine, and the player of that gaming machine must have wagered a maximum amount for the progressive jackpot award to be triggered.

Several variations on this typical scheme are known. In one variation, the new progressive jackpot pool is not solely replenished by the operator or owner. Instead, the base component is initially funded by the owner or operator. Subsequently, a first portion of each wager from the participating gaming machines is supplied to the incremental component of the progressive jackpot pool, as described above. However, a second portion of each wager is provided to a separate pool of money, termed a hidden pool in the present application. The hidden pool is intended to fund the replenishment of the base component of the progressive jackpot pool after the progressive jackpot has been won, instead of receiving funds from the owner or operator. The amount of the second portion of each wager of the participating gaming machines is calculated so that it is expected to cover replenishing the base component of the progressive jackpot pool as that pool is won and awarded to players over the duration of the progressive game.

In another variation, when the progressive jackpot is won, a portion of the progressive jackpot pool (e.g. 600 units) is given to the player who wagered the maximum amount at the gaming machine on which the winning symbols occurred, and the remainder is allocated to other players according to a predetermined scheme. For example, the remainder may be allocated to other players playing the same game, other players playing at the same carousel, other players who have wagered the maximum amount, or some combination of these or other criteria intended to maintain player interest. In one embodiment, the money in the jackpot pool is split evenly among the eligible players. In another embodiment, a larger proportion (e.g. one-half) is allocated to the player at the winning gaming machine, and the remainder (e.g. the other half) is split evenly among the other players. Other methods of allocating the money in the jackpot pool among players are known.

A prior art partial pay progressive jackpot system is similar to known traditional progressive jackpot systems described above. In this partial progressive jackpot system, a progressive jackpot is awarded to the player at a gaming machine on which the winning symbols appeared, even if that player did not wager the maximum amount. In this variation, the progressive jackpot awarded to the player is related to the wager made by the player. When winning symbols occur at a gaming machine, that gaming machine reports a progressive jackpot award win. The progressive jackpot system performs the steps described above with respect to awarding the progressive jackpot in the traditional system. However, instead of awarding the full progressive jackpot pool to the player, only a portion of that pool is awarded to the player. The remainder is retained in the progressive jackpot pool as a portion of the incremental component.

For example, in response to a winning game result, the amount awarded to the player may be proportional to the wager. That is, if the maximum wager is 3 units, and the player wagered 1 unit, the player is awarded ⅓ of the jackpot pool. The progressive jackpot is then replenished as described above. That is, the player is awarded the proportion of the progressive jackpot allocated to him (e.g. ⅓) Then the owner or operator, or a hidden pool, replenishes the base component of the progressive jackpot pool, and the remainder of the previous progressive jackpot pool not awarded to the player (e.g. ⅔) is added to the incremental component of the progressive jackpot pool. Then the participating gaming machines contribute a portion of each wager to the progressive jackpot pool until all or some portion of it is won again.

Referring to FIG. 2, in an example of such a partial pay progressive jackpot system the owner or operator, or a hidden pool, has established a base component of 500 units in the progressive jackpot pool. Participating gaming machines have contributed a portion of each wager to the incremental component of the progressive jackpot pool to the point where an additional 100 units has been added to the pool for a total of 600 units in the progressive jackpot pool. A player at a participating gaming machine gets the winning symbols on his gaming machine after betting ⅓ the maximum wager. This triggers the award of a progressive jackpot award to that player. Continuing the above example, the player is awarded 200 units, or ⅓ of the progressive jackpot pool. After the award, the base component of the progressive jackpot pool is replenished to the amount of 500 units. The remainder of the preceding progressive jackpot pool, i.e. 400 units, is retained and carried over to the new progressive jackpot pool, so the new progressive jackpot pool begins anew with 900 units in it.

Such an arrangement has problems. First, after winning a progressive jackpot award, the player may be confused when he sees that the amount in the progressive jackpot pool is higher than it was before he won the award. Second, over the life of the progressive game, such a progressive jackpot system ends up paying out more money than the traditional progressive jackpot system described above. Traditional progressive jackpot systems generally operate on the assumption that players wager a maximum amount only about 85% of the time. Consequently, in the traditional progressive game, 15% of the time players would have no chance of being awarded the progressive jackpot, even though winning symbols appear on the gaming machine. That lengthens the time between awards of the progressive jackpot because 15% of the time the maximum wager was not made. Awarding partial progressive jackpots in the manner described above produces unintentional and adverse effects on the overall mathematics of the game in the participating gaming machine. Third, such an arrangement decreases the motivation to wager the maximum amount because no matter what the wager is, the player has a chance to win at least a portion of the progressive jackpot pool.

In yet another variation of a partial pay progressive jackpot system, the progressive jackpot award made to the player is funded partially from the base component of the progressive jackpot pool, and partially from the incremental component. In this variation, a player may be awarded a progressive jackpot amount determined as described above. That is, if the player wagers ¼ of the maximum wager, and a winning game result occurs, the player is awarded ¼ of the progressive jackpot.

Referring to FIG. 3, in this case, the player wagered one unit out of a maximum wager of 4 units. A winning game result occurred at the gaming machine. Consequently, the player is awarded ¼ (25%) of the amount in the progressive jackpot pool. This is illustrated in FIG. 3 by the "25%" over the thick arrows. The amount in the progressive jackpot pool is, as before, 600 units: 500 units in the base component, and 100 units in the incremental component. The player is, thus, awarded 150 units. That award is made up of ¼ of the base amount of 500 units, or 125 units, and ¼ of the incremental amount of 100 units, or 25 units, for the total of 150 units. After the progressive award has been made to the player, the base amount is replenished to the predetermined amount by the owner and operator, or hidden pool. After the award to the player, the amount remaining in the base component is 375 units. The amount necessary to replenish the base component to the required amount of 500 units is 125 units, which is the amount which had been awarded to the player from the base component. The amount remaining in the incremental component after the award to the player is 75 units. This amount is added to the replenished base component. The new progressive jackpot pool, thus, has 575 units. At this point, the progressive game continues until it is won again.

This arrangement also has problems. Because the progressive payout amount is proportional to the player wager, there is no incentive for the player to wager the maximum wager. Further, in this arrangement, the progressive jackpot award made to the player is simply a proportion of the progressive jackpot pool equal to the proportion of the actual wager to the maximum wager; the game mathematics is not considered.

A progressive jackpot system which awards partial progressive jackpot amounts, but which avoids the problems described above is desirable.

BRIEF DESCRIPTION OF THE INVENTION

In accordance with principles of the present invention, a progressive jackpot system includes a progressive jackpot system controller, and a plurality of gaming machines coupled to the progressive jackpot system controller and participating in a progressive jackpot game in which a progressive jackpot is awarded in response to a triggering event at one of the gaming machines. A method of operating the progressive jackpot system includes maintaining data in the progressive jackpot system controller representing a composite progressive jackpot pool comprising a predetermined base component, and an incremental component funded by a portion of wagers made at the gaming machines. A message is sent from a gaming machine to the progressive jackpot system controller in response to the occurrence of a triggering event on the gaming machine. The message indicates that the triggering event has occurred and includes data representing a desired proportion of the progressive jackpot pool to award to the player. The progressive jackpot system controller calculates a composite progressive jackpot award to award to the player based on the current progressive jackpot pool and the desired progressive jackpot award proportion. The composite progressive jackpot award includes a first component funded from the base component of the progressive jackpot pool, and a second component funded from the incremental component of the progressive jackpot pool. A message is sent from the progressive jackpot system controller to the gaming machine indicating the amount of the progressive jackpot pool to award to the player. The progressive jackpot system controller replenishes the base component of the progressive jackpot pool to the predetermined amount.

BRIEF DESCRIPTION OF THE DRAWING

FIG. 3 is a diagram illustrating the transfer of funds in another prior art partial pay progressive jackpot system;

FIG. 4 is a block diagram illustrating a progressive jackpot system according to principles of the present invention;

FIG. 5 is a table illustrating partial pay progressive jackpot amounts in another embodiment according to principles of the present invention;

DETAILED DESCRIPTION

Figure 1:
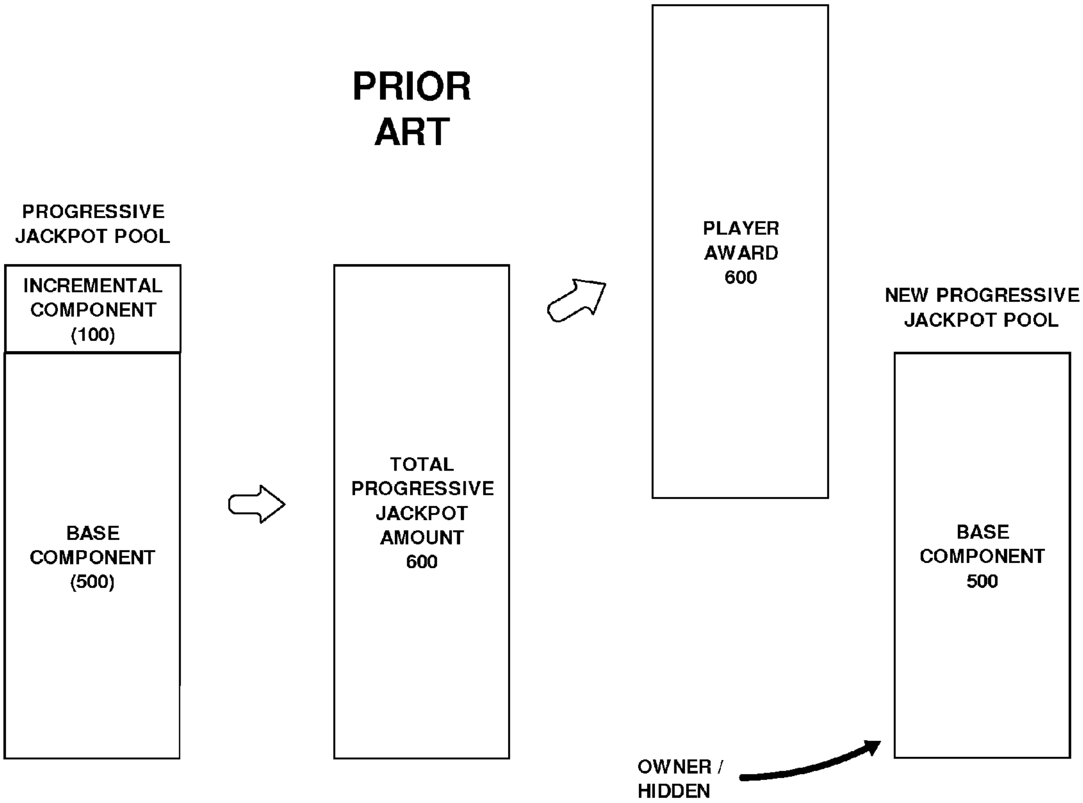
FIG. 1 is a diagram illustrating the transfer of funds in a prior art traditional prior art progressive jackpot system.
Figure 2:
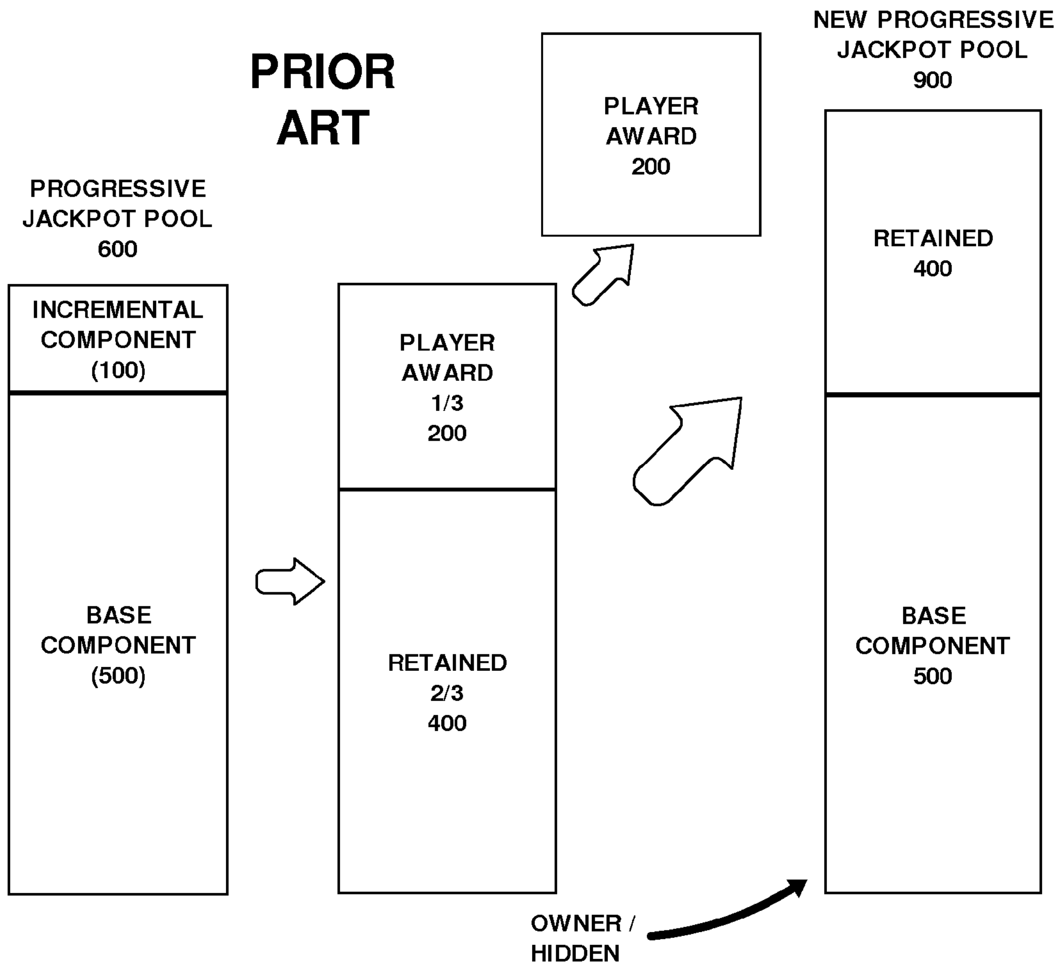
FIG. 2 is a diagram illustrating the transfer of funds in a prior art partial pay progressive jackpot system.

FIG. 4 is a block diagram of a progressive jackpot system 10. The system 10 includes a progressive jackpot system controller 110 and a plurality 100 of gaming machines 100*a*-100*n*. The plurality of gaming machines 100 participate in a progressive jackpot game in which a progressive jackpot is awarded in response to a triggering event at one of the gaming machines 100*a*-100*n*. A communications link 120 interconnects the progressive jackpot system controller 110 and the gaming machines 100. Information is communicated between the progressive jackpot system controller 110 and the gaming machines 100 via messages passed along the communications link 120. The messages are formatted and communicated according to standards known as protocols.

The progressive jackpot system controller 110 maintains data representing a composite progressive jackpot pool including a predetermined fixed base component, funded by an owner or operator, and/or a hidden pool, and an incremental component funded by a portion of each wager made at the gaming machines 100. Data representing the portion of each wager from the gaming machines 100 is sent to the progressive jackpot system controller 110 via a message from the gaming machines 100 to the progressive jackpot system controller 110 over the communications link 120. The progressive jackpot system controller 110 receives these messages and updates the amount in the incremental component of the progressive jackpot pool appropriately in a known manner.

The gaming machines 100 may be video-based card games, video-based slot machines, mechanical slot machines, or any similar game producing randomly selected ones of a plurality of available game results. These game results may be selected in response to a random number generator in the gaming machines 100, or in response to data sent from a central location (not shown) to the gaming machines 100. Among the plurality of available game results is a game result, termed a winning game result in this application, which may be a predetermined pattern of cards in a card game or winning symbols in a slot machine.

In a traditional progressive game, a progressive jackpot award is triggered when a winning game result occurs at a gaming machine 100*a*-100*n* and the player at that gaming machine 100*a*-100*n* has wagered the maximum amount. In this case a message, termed a full jackpot award message in this application, is sent from the gaming machine 100*a*-100*n* to the progressive jackpot system controller 110 via the communications link 120 indicating that the progressive jackpot triggering event has occurred and the full progressive jackpot should be awarded to the player. In response to receipt of a full jackpot award message, the progressive jackpot system controller 110 sends a message to the gaming machine 100 indicating the amount in the progressive jackpot pool to be awarded to the player. The progressive jackpot system controller 110 then replenishes the progressive jackpot pool to the predetermined amount by funding the fixed base component by a contribution from the owner or operator and/or a hidden pool. The progressive jackpot system controller 110 then resumes funding the incremental component by portions of wagers received from the gaming machines 100, all as described above with respect to FIG. 1.

In accordance with principles of the present invention, a progressive jackpot award may be won by a player without requiring a maximum wager. In the present invention, if a triggering event occurs at one of the gaming machines 100, that gaming machine 100*a*-100*n* specifies the percentage of the progressive jackpot pool to be awarded to the player. More specifically, the game mathematics in the gaming machine 100*a*-100*n* determines the progressive jackpot payout percentage when a winning game result occurs and less than the maximum wager has been made. Referring to FIG. 5, table 500 illustrates a correspondence between amounts wagered and progressive jackpot award percentages, as specified in the gaming machine 100*a*-100*n*. More specifically, in FIG. 5, the maximum wager is 5 units. If a winning game result occurs and the player wagered 4 units, then the progressive jackpot payout percentage specified by the gaming machine 100*a*-100*n* is 40%; if the player wagered 3 units it is 30%, and so forth.

Figure 6:
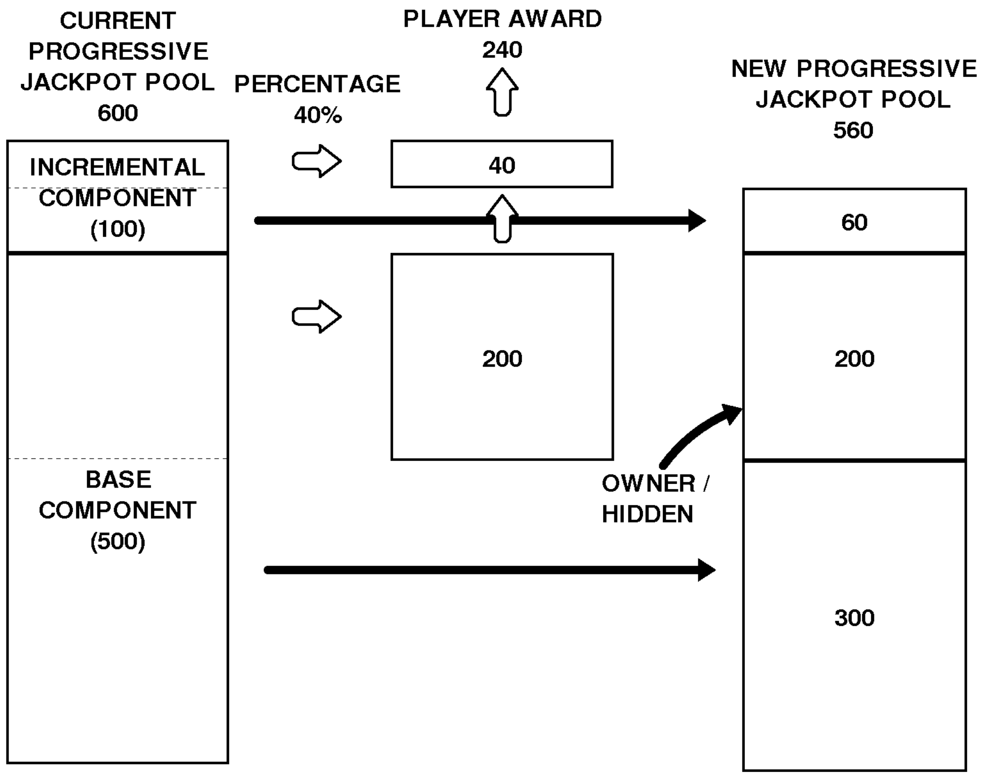
FIG. 6 is a diagram illustrating the transfer of funds in a system according to principles of the present invention.
Figure 7:
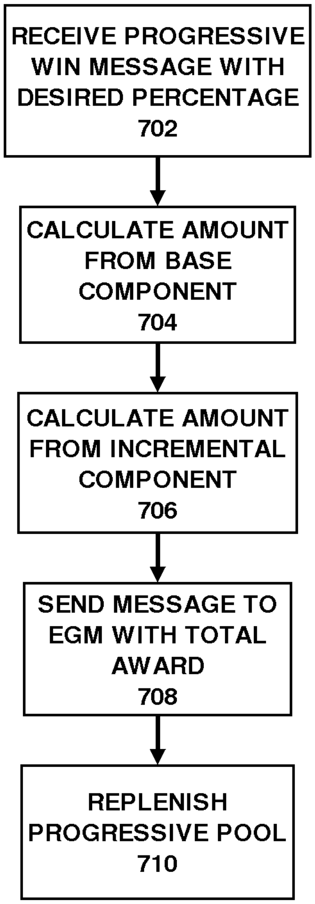
FIG. 7 is a flow diagram illustrating the operation of a progressive jackpot system controller in accordance with another embodiment in accordance with principles of the present invention.

Referring to FIG. 5, FIG. 6 and FIG. 7, assume that, similarly to FIG. 3, the current progressive jackpot pool has 500 units in the base component and 100 units in the incremental component. Also assume a winning game result occurs at a gaming machine 100*a*-100*n* where the player wagered 4 units of a maximum 5 unit wager. This is a triggering event. The gaming machine calculates the desired progressive jackpot award percentage to be 40%, as illustrated in table 500. Data representing table 500 may be stored in the gaming machine 100*a*-100*n*, or an arithmetic algorithm may be specified to calculate the desired progressive jackpot award percentage as a function of the maximum wager and the actual wager.

The gaming machine 100*a*-100*n* (FIG. 4) sends a message, termed a partial jackpot award message, to the progressive jackpot system controller 110 via the communications link 120. This message indicates that the triggering event has occurred and further includes data representing the proportion of the progressive jackpot to award to the player (i.e. 40%), as calculated by the gaming machine. This new message format is added to the message protocol allowing the gaming machines 100 to send this information to the progressive jackpot system controller 110.

Referring to FIG. 6 and FIG. 7, the progressive jackpot system controller 110 receives the partial jackpot award message from the gaming machine 100*a*-100*n* including data representing the desired percentage, e.g. 40% in the present example (FIG. 7—block 702). The progressive jackpot system controller 110 calculates a first progressive jackpot award component from the base component of the progressive jackpot pool, e.g. 40% of 500 units or 200 units in the present example (FIG. 7—block 704), and a second progressive jackpot award component from the incremental component, e.g. 40% of 100 units or 40 units in the present embodiment (FIG. 7—block 706). The progressive jackpot system controller 110 sends a message to the gaming machine with the total amount of the jackpot to be awarded to the player (FIG. 7—block 708), e.g. 200 units from the base component plus 40 units from the incremental component for a total progressive jackpot award of 240 units in the present example, as shown in table 500 (FIG. 5).

In the present example, the remainder in the base component after awarding the progressive jackpot is 300 units, and the remainder in the incremental component after awarding the progressive jackpot award is 60 units. The progressive jackpot system controller 110 then replenishes the base component of the progressive jackpot pool to the predetermined amount of 500 units. This is done by providing 200 units (which is the amount of the progressive jackpot award component allocated from the base component of the progressive jackpot award pool) from the owner or operator or from a hidden pool. The remaining portion of the incremental component, e.g. 60 units in the current example, is then added to the progressive jackpot pool as the incremental component (FIG. 7—block 710). The new progressive jackpot pool, thus, contains 560 units, as illustrated in FIG. 6.

In the present embodiment, both the gaming machines 100 and the progressive jackpot system controller 110 are modified compared to the prior gaming machines 100 and progressive jackpot system controllers 110. More specifically, the gaming machine 100*a*-100*n* is modified to specify the percent of the progressive jackpot pool is paid to the player in the event of a winning game result and less than maximum wager. The progressive jackpot system controller 110 is modified to allocate a partial jackpot award between the base component and the incremental component of the progressive jackpot pool. Also, changes are made in the "game to controller" protocol, so the gaming machines 100 may notify the progressive jackpot system controller 110 as to what the exact percentage of the progressive jackpot pool the game mathematics desires to pay the player. Thus, in this embodiment the partial pay would track the mathematics of the game. The progressive jackpot controller 110 logs the progressive jackpot percentages that the gaming machines 100 sends to the progressive jackpot system controller 110, and records the progressive jackpot pool adjustments made.

The game personality could also be designed to highlight this "Win Without Max Bet" feature. It could display on screen the exact values the player would expect to win based on the number of units wagered. This would be a constant reminder that a higher wager has the chance of winning a better payoff. Game mathematics may be specifically designed to take into consideration the additional payouts that would occur from hitting the winning symbol combination without the player placing a maximum wager.

A system 10 (FIG. 4) has been described above which provides an improved partial pay progressive jackpot system. The following are changes to current gaming systems which allow the progressive jackpot system described above to be implemented. A new 'partial pay jackpot' message is added to the protocol. The new partial pay jackpot message includes a desired progressive jackpot payout percentage. Any legacy 'full jackpot pay' messages in the previous version of the protocol continue to operate as normal, paying the full amount of the progressive jackpot. However, in a system according to principles of the present invention, a gaming machine 100*a*-100*n* now has the option to use the partial pay jackpot message for both partial pays and as full pay (100%) progressive jackpots The progressive jackpot system controller 110 processes the partial pay messages from the gaming machines 100 and adjusts the progressive jackpot pool, and the hidden pool, if implemented, as necessary. The progressive jackpot system controller 110 logs the percentage-to-pay value sent from the gaming machines 100 and logs the adjustments to the progressive jackpot pool and the payouts awarded to the player.

The operating system in the gaming machines 100 is able to get the partial pay information (e.g. wager made, maximum wager, and/or desired progressive jackpot payout percentage) from the game and include that information in the partial pay jackpot message sent to the progressive jackpot system controller 110 via the communications link 120.

The gaming machine 100 may show the player what the current value of the progressive jackpot which may be awarded to the player based on the number of units wagered. The gaming machine also sends the correct desired pay percentage to the operating system for delivery to the progressive jackpot system controller 110.

What is claimed is:

1. A method of operating a progressive jackpot system including a progressive jackpot system controller, and a plurality of gaming machines coupled to the progressive jackpot system controller and participating in a progressive jackpot game in which a progressive jackpot is awarded in response to a triggering event at one of the gaming machines, the method comprising:

said jackpot system controller maintaining data representing a composite progressive jackpot pool comprising a predetermined fixed base component, and an incremental component funded by a portion of wagers made at the gaming machines;

each of said gaming machines configured for sending a message to the progressive jackpot system controller in response to the occurrence of a triggering event on the gaming machine, the message indicating that the triggering event has occurred and including data representing a desired proportion of the progressive jackpot pool to award to the player;

said progressive jackpot system controller calculating a composite progressive jackpot award for the player based on the desired progressive jackpot proportion and comprising a first component funded from the fixed base component of the progressive jackpot pool, and a second component funded from the incremental component of the progressive jackpot pool;

said progressive jackpot system controller sending a message to the gaming machine experiencing the triggering event indicating the amount of the progressive jackpot award for the player; and said progressive jackpot system controller replenishing the fixed base component of the progressive jackpot pool to the predetermined amount.

2. The method of claim 1 comprising each gaming machine configured for calculating the desired proportion of the progressive jackpot pool to award to the player based on the amount of the wager and the amount of the maximum wager.

3. The method of claim 2 comprising each gaming machine configured for calculating the desired proportion of the progressive jackpot pool to award to the player based on the amount of the wager and the amount of the maximum wager by accessing a table stored in the gaming machine comprising respective entries representing the desired proportion of the progressive jackpot pool to award to the player for each possible wager.

4. The method of claim 2 comprising each gaming machine configured for calculating the desired proportion of the progressive jackpot pool to award to the player based on the amount of the wager and the amount of the maximum wager by performing an arithmetic algorithm to calculate the desired progressive jackpot award percentage as a function of the amount of the wager and the amount of the maximum wager.

5. The method of claim 2 comprising each gaming machine configured for calculating the desired proportion of the progressive jackpot pool to award to the player based on the amount of the wager and the amount of the maximum wager by calculating the desired proportion of the progressive jackpot pool to award to the player if the amount of the wager is the amount of the maximum wager to be 100%.

6. The method of claim 5 comprising each gaming machine configured for calculating the desired proportion of the progressive jackpot pool to award to the player based on the amount of the wager and the amount of the maximum wager by calculating the desired proportion of the progressive jackpot pool to award to the player to be less than the proportion of the amount of the wager to the amount of the maximum wager.

7. The method of claim 1 comprising each gaming machine configured for sending a message to the progressive jackpot system controller in response to the occurrence of a triggering event by a said gaming machine experiencing the triggering event configured for sending a 'full jackpot award message' to the progressive jackpot system controller for awarding a full progressive jackpot to the player at the gaming machine.

8. The method of claim 1 comprising each gaming machine configured for, in response to the occurrence of a triggering event at a said gaming machine, sending a 'partial jackpot award message' from the said gaming machine to the progressive jackpot system controller if a partial progressive jackpot is to be awarded, said partial jackpot award message including data representing the desired proportion of the progressive jackpot to award to the player at the gaming machine, calculated by the gaming machine.

9. The method of claim 8 comprising each gaming machine configured for sending a message from the gaming machine to the progressive jackpot system controller in response to the occurrence of a triggering event by sending a partial jackpot award message from the gaming machine to the progressive jackpot system controller if a progressive jackpot triggering event has occurred and the full progressive jackpot is awarded; and the partial jackpot award message includes data representing a proportion of 100% of the progressive jackpot to award to the player at the gaming machine, calculated by the gaming machine.

10. The method of claim 1 comprising said progressive jackpot controller configured for calculating a composite progressive jackpot award for the player based on the desired progressive jackpot proportion including funding the first component equal to the desired progressive jackpot proportion of the base component of the progressive jackpot pool and funding the second component equal to the desired progressive jackpot proportion of the incremental component of the progressive jackpot pool.

* * * * *